United States Patent [19]
Nowicki et al.

[11] 3,787,118
[45] Jan. 22, 1974

[54] COMPENSATION MEANS FOR POLARIZED LIGHT ELECTRO-OPTICAL MODULATOR

[75] Inventors: Thomas Nowicki, Oakland, N.J.; John I. Shipp, Tullahoma, Tenn.; Robin H. Hines, Tullahoma, Tenn.; Thomas D. Broadbent, Tullahoma, Tenn.

[73] Assignee: AGA Corporation, Seacaucus, N.J.

[22] Filed: July 11, 1972

[21] Appl. No.: 270,705

[52] U.S. Cl............. 356/5, 332/7.51, 350/162 SF, 350/150
[51] Int. Cl.............................................. G01c 3/08
[58] Field of Search... 332/7.51; 356/5; 350/162 SF, 350/150

[56] References Cited
UNITED STATES PATENTS
3,446,971  5/1969  Ruddock................................ 356/5
3,297,876  1/1967  De Maria.......................... 332/7.51

OTHER PUBLICATIONS
Nakazawa, Japan Electr. Eng., 7-1971, No. 56 pp. 30-36.

Primary Examiner—Maynard R. Wilbur
Assistant Examiner—S. C. Buczinski

[57] ABSTRACT

When a polarized light beam is electro-optically modulated as it passes through a birefringent crystal there are created observed divergent beams caused by internal diffraction. In order to eliminate these observed divergent beams from the central beam so as to avoid distortion caused by interference between the divergent beams and the main central beam, a converging lens is placed between the source of polarized light and the birefringent crystal to converge the central beam at a point substantially distant from the output of the birefringent crystal. At a point beyond the focal length of the converging lens there is placed an aperture aligned with the central beam and of a size equal to the size of the central beam, but small enough so as not to pass any light from the divergent beams, thus eliminating these divergent beams and allowing just the central beam, properly modulated, to pass through the aperture.

7 Claims, 3 Drawing Figures

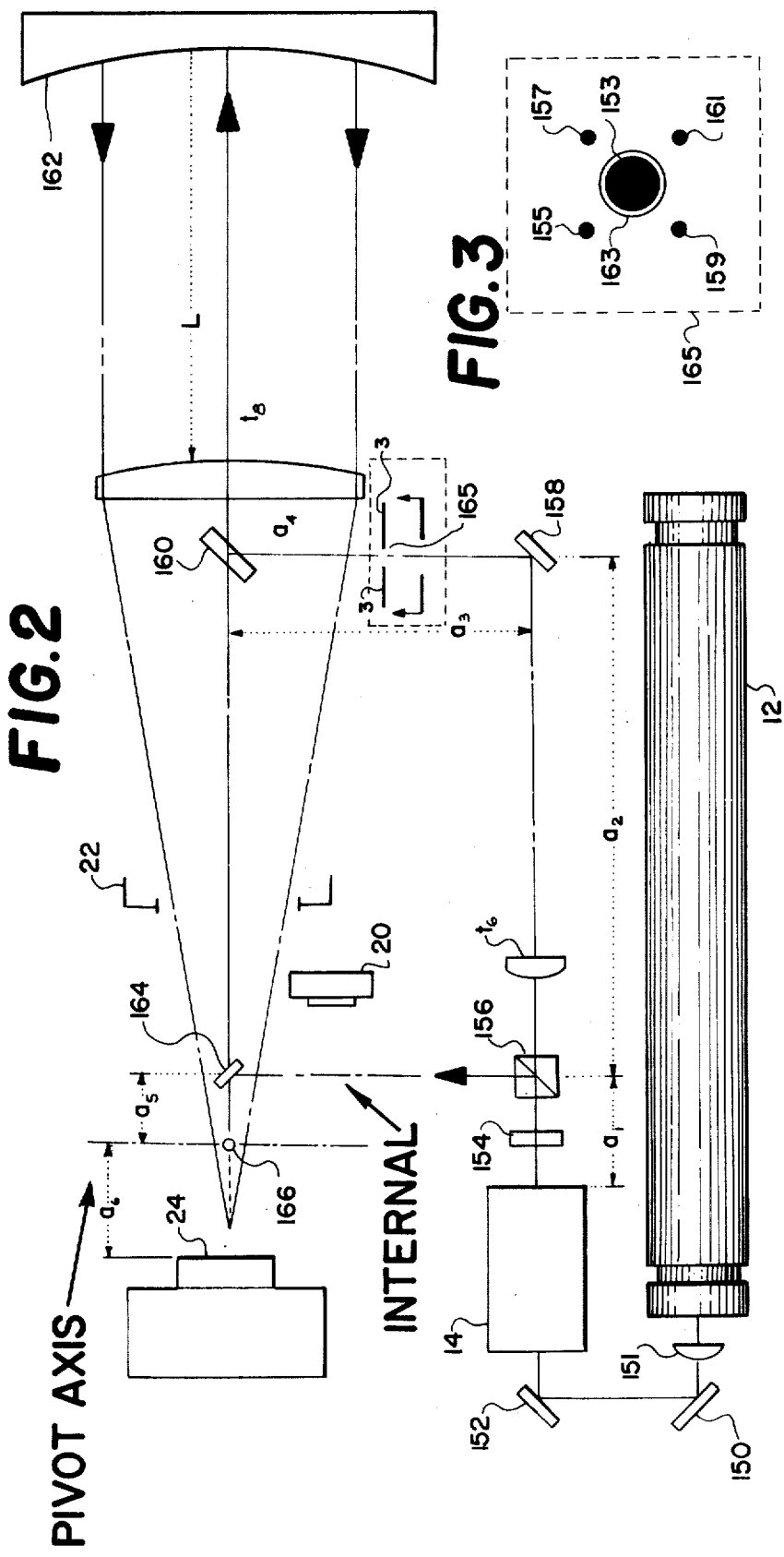

COMPENSATION MEANS FOR POLARIZED LIGHT ELECTRO-OPTICAL MODULATOR

BACKGROUND OF THE INVENTION

Electro-optical equipment for distance measuring has been known for many years. With the advent of different sources of light intensity, new retroreflectors, and advances in electronic and computer technology, it has been possible to increase, significantly, the range and accuracy of these instruments so that they become a necessary tool for the surveyor. In the past, laser distance measuring device was operative to transmit a co-axial beam at a retroreflector positioned at a target. This beam was then returned to the instrument coaxially and focused onto a receiving photodiode. Through various methods including an iris or variable aperture, the intensity of the return light is controlled. The laser produces a polarized beam which is modulated by a multitude of frequencies with the distance accuracy being determined in part by the number of frequencies utilized to modulate the laser. The light impinging upon the photo diode from the retroreflector is then compared to the light impinging on the photodiode from the internal path of light of the laser and substracted one from the other to obtain the range measured (the range being equal to twice the actual distance to the target).

In order for the distance to be correctly measured, the polarized light from the laser must be accurately modulated without distortion. However, in a number of instruments there has been discovered a distortion of the modulated light signal emitting from the elector-optical modulator which caused severe inaccuracies to be noted, especially when measuring short distances. These distortions prevent accurate ranging at short distances and, although it is obvious that these distortions occured in the electro-optical modulator, there was no recognition of the manner in which such distortions creeped into the system so that no solution was possible to the problem.

SUMMARY OF THE INVENTION

Electro-optical modulators used with gas lasers are normally birefringent crystals such as a potassium deuterium phosphate (KD*P) crystal. Birefringence is a property which can be defined as that property which will cause a different index of refraction through the material for polarized light passing in different directions through the material. Thus, when polarized light, as that forth coming from a laser, passes through the birefrigent crystal, it can be seen that the vector components of the polarized light, which components are orthogonal to one another, will pass through the crystal at different speeds due to the different indexes of refraction so as to cause them to be out of phase when they pass out of the crystal.

By applying a varying voltage to the birefringent crystal in a standard electro-optical modulator, one generates a changing polar vector. Since, normally, on the output of the crystal there is provided an analyzer, this changing polar vector is transformed into an amplitude modulated polarized light output. The analyzer may be any analyzer such as polarized light filter, a Glan-Thomas prism or a MacNeil prism. This amplitude modulation of the polarized light is maintained linear by biasing the crystal, either optically, mechanically, or electrically so that the amplitude modulation occurs in the linear portion of its curve. This biasing can be accomplished optically by utilizing a quarter wave plate; electrically, by utilizing a d-c voltage bias; or mechanically by moving the crystals so that the optical axis of the crystal is at an angle to the axis of light propogation.

As was indicated, distortions in phase and interference patterns in the amplitude modulated polarized light source have been observed, at short ranges from the modulator, but were unexplained. These distortions had prevented accurate distance measurement at these short distances (for example up to 100 yards) and with no adequate explanation available, the situation had been ignored rather than investigated. In the present invention, this distortion has been eliminated by noting that in the birefringent crystal there are created observed divergent beams caused by internal diffraction Where the birefringent crystal is a parallelepiped, divergent beams are created diverging about the central main beam at acute angles to the axis of propagation. In a square cross section parallelepiped crystal the acute angles are equal and the planes containing the acute angles are at right angles to one another. As was indicated, these are observed divergent beams, and although it is not necessary for the purpose of this invention, it might be possible that there is only a single beam that is moving in space but is observable as four beams at acute angles to the axis of propagation of the main beam.

The reasons for this phenomena occuring are not theoretically known. One suggestion is that the optical effect of the piezo-electric effect of voltage on the birefringent crystal causes internal refraction which creates these divergent beams. Alternatively it might be an electrostatic effect within the crystal. In any event, whatever the reason for their presence, these divergent beams are out of phase with the main beam and, during magnification, and collimation, the divergent beams remain sufficiently close to the main beam during the initial travel of the main beam so as to cause interference with the main beam, and accordingly, distort the main beam phase angle. This is what has caused so much error in measuring short ranges. After a short distance, the divergent beams move away from the main beam sufficiently so as to avoid any further distortion thereof.

In order to eliminate this type of distortion, a simple optical means has been developed. Without recognition of the problem, however, the solution would not be easily determined. It is by recognition of this problem, that is is possible to determine the manner of solving the same. That is, the present invention contemplates the utilization of a converging lens between the output of the laser and the birefringent crystal electro-optical light modulator. This converging lens has a long focal length and concentrates the central beam to a point within the instrument spaced from the electro-optical modulator. Since the converging lens operates only on the central beam before entering the birefrigent crystal, it will have little effect upon the divergent beams caused by the distortions of the crystal. Accordingly, this will space the central beam from the divergent beams at a point in space from the crystal. At that point, the polarized light from the birefringent crystal can pass through a shield having an aperture aligned with the central beam whose diameter is substantially equal to the size of the central beam, and smaller than the spacing of the divergent beams so as to prevent the divergent beams from passing any further through the instrument. Thus, only the central beam will then continue through the instrument for measurement and since this beam is now undistorted by the divergent beams, there will be no phase distortion and hence no error in the measurement even at short distances. For example, before the compensation above described was inserted into a distance measuring instrument, there was observable a 30-40 centimeter shift across the beam at short distance measurements. After the compensation device had been inserted so as to allow only the central beam to pass out of the instrument, there was only a five millimeter shift across the beam at short distances and it will be understood, that this is well within the acceptable practical tolerances for such instruments.

DETAILED DESCRIPTION OF THE DRAWINGS

FIG. 2 is a diagramatic showing of the lens system of the present invention.

FIG. 3 is an end view of the shield and the beams as they are viewed at lines 3—3.

Figure 1:
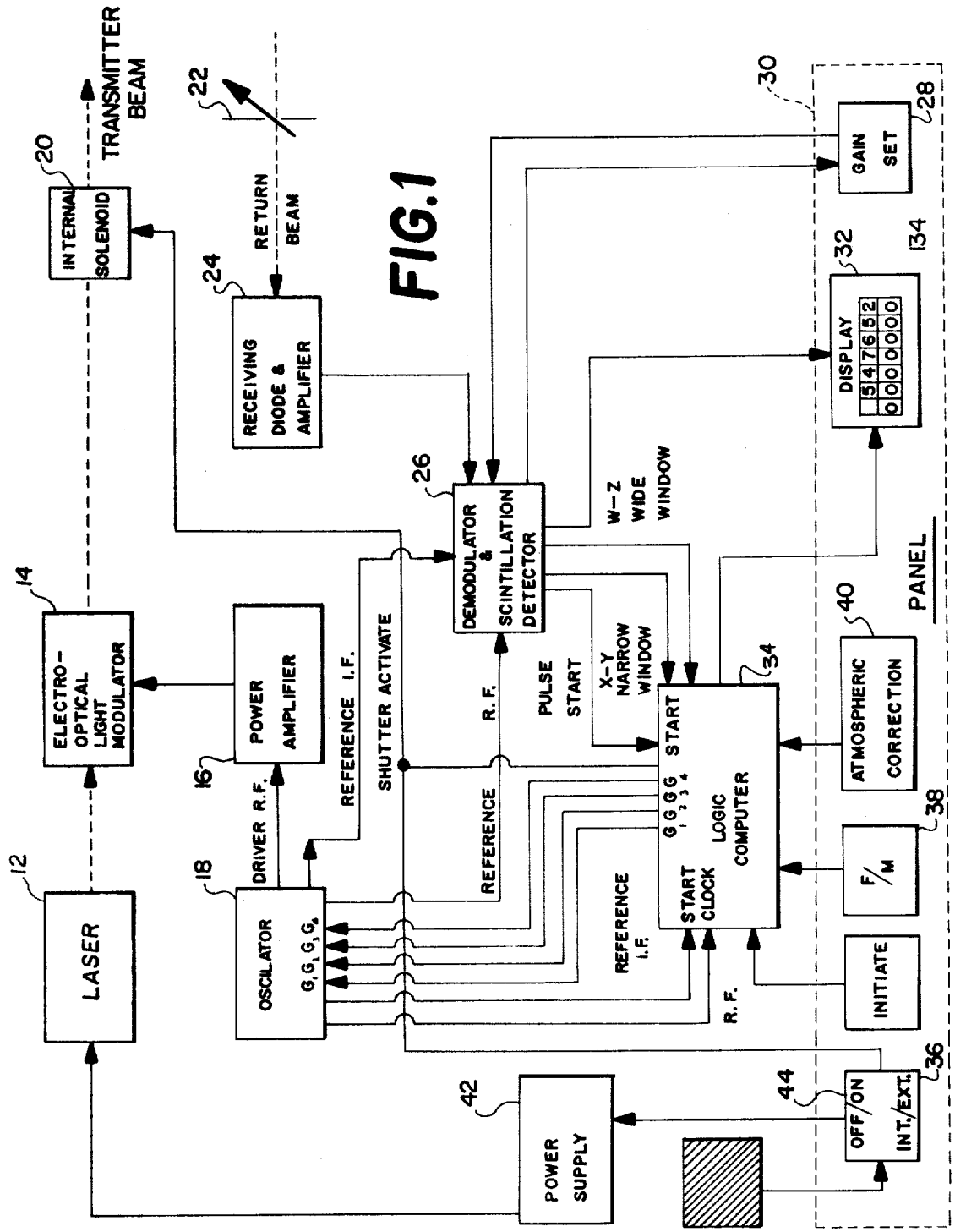
FIG. 1 is a block schematic diagram of a distance measuring instrument built in accordance with the principles of the present invention.

In FIG. 1, the distance measuring instrument of the present invention is generally designated by the numeral 10. The instrument 10 includes a helium-neon laser 12 which is modulated at three frequencies by an electro-optical light modulator 14 (KD*P) which includes a potassium deuterium phosphate crystal. The electrical optical light modulator 14 is controlled by a signal received from a power amplifier 16, which amplifier amplifies one of the output signals from an oscillator 18.

The oscillator 18 transmits to the power amplifier 16 a signal at an upper side band frequency ($F_1$) equal to the sum of the reference frequency ($F_1$) of a crystal oscillator in the oscillator 18 and an intermediate frequency that is derived from and is $10^4$ less than the reference frequency. The phase measurement is made at the intermediate frequency obtained by down converting the received frequency with the reference frequency. Within the oscillator module 18, the reference frequency is divided by $10^2$ and $10^3$ to obtain signals of approximately 150KHz and 15KHz. These two signals are combined with the basic reference signals ($F_1$) to obtain two other reference signals ($F_2'$) and ($F_3'$) respectively. The two new reference signals are then combined with the intermediate frequency to obtain two othertransmission signals $F_2$ and $F_3$. By appropriate analog gating techniques, the transmission and reference signals are activized in pairs $F_1$ and $F_1'$, $F_2$ and $F_2'$, and $F_3$ and $F_3'$ by corresponding logic gates from the logic computer to the gate inputs $G_1$, $G_2$ and $G_3$ respectively. Thus, all required frequencies are obtained from a single oscillator crystal. A terminal $G_4$ is provided for the oscillator 18 so that, in a manner which will be discussed below, after fifty pulses have been counted, the oscillator 18 will be shifted in phase 90° for the next 50 counts. Counting in this way, eliminates all distortions due to the second harmonics, which distortions have been previously been effected by placing 90° phase shifters between the power amplifier 16 and the electrooptical light modulator 14. By doing the phase shifting electronically, rather than by inserting a loss member, more accurate readings are possible without distortion to the transmitted signal.

It should be noted, for reasons which will be discussed below, that only three reference frequencies are required when spanning a range, which is capable of providing the same distance measurement as distance measuring instruments utilizing four reference frequencies.

The output from the electro-optical light modulator is transmitted through an optical system best shown in FIG. 2 and controlled by an internal solenoid 20 and directed at a target retroreflector. The beam is transmitted coaxial to the retroreflector so that the return light beam is received back through an iris diaphram 22 onto a receiving diode and amplifier 24. The iris diaphram 22 is variable so that it may be properly set at a desired return signal level. The receiving diode and amplifier 24 includes a photo diode. The output of the receiving diode and amplifier 24 is fed to a demodulator and scintilitation circuit 26. This return radio frequency signal is demodulated with respect to the reference RF signal from oscillator 18 which also supplies the reference IF to the demodulator and scintillation detector 26. The gain of the intermediate frequency signal is set by a gain control knob 28 on the panel 30 of the instrument. Also on the panel 30 is a suitable display 32 which consists of a series of seven bulbs 134 which indicate the signal level being received by the receiving diode and amplifier 24. The display is set up so that one attempts to make sure that only the center bulb of the seven bulbs 134 is in fact operative indicating that a correct signal is being received for measurement. Also in the display 32 there is shown the seven figures of the final measurement being made.

It should be noted that for each signal being read, the instrument is calibrated for the internal path of the instrument itself so that the final distance measured is in fact the distance from the plumb center of the distance measuring instrument to the retroreflector at the target. The demodulator and scintillation detector 26 feeds a start pulse to a logic computer 34 which does the measurement for the distance and provides the final distance measurement to the display 32. The logic computer 34 is supplied with the reference IF signal and the clock signal from the oscillator 18. The start up of the instrument is controlled by a suitable start button 36 on the instrument panel itself. The panel 30 further has thereon a switch 38 which merely sets the logic 34 so that a readout will be in either feet or meters depending upon the needs of the user. Atmospheric correction is supplied to the logic circuit by a control 40 on the instrument panel and, thus, at the end of any given reading, a suitable correction will be made for the particular atmospheric conditions so that one will provide a direct reading on the display 32 of the actual distance measured.

The entire instrument 10 is supplied suitable power from a power source 42 and the solenoid 20 is operated by suitable Off-On and internal external control 44. There is no need for calibrating internal offset in the instrument for reasons that will be discussed with the respect to the arrangement in FIG. 2.

Since the phase measurement is made at an intermediate frequency, the return signal at the intermediate frequency is obtained by mixing at the demodulator 26 the return RF with a reference signal that differs from the transmitted signal by 1.498 KHz. Three frequencies are involved, as was discussed previously. They will produce three readings, $\phi_1$, $\phi_2$, and $\phi_3$. $\phi_1$ will provide a reading from 0.01 ft. to 10 ft. or 1 mm to 10 mm; $\phi_2$ will provide a reading from 10 ft. to 1,000 ft. or 10 m to 1 km; and $\phi_3$ will provide readings from 1,000 ft. to 10,000 ft. or 1 km to 10 km.

The phase measurement is made between the start pulse the logic circuit 34 and a stop pulse at the reference I.F. which is received from the oscillator 18. Since the clock pulses are measured between the start pulse and the stop pulse, the total count is a fractional part of the half wave length of the modulated frequency. For the basic frequency, $F_1$ equal 14.989625 MHz with a half wave length of 10 meters, the least count is 1 millimeter. The other frequencies of $F_2$ equal to 14.974635 MHz and $F_3$ equal to 14.839279 MHz are used to determine the range.

Using the general functional requirements, the first step is to acquire phase data:

```
 1. F₁, ψ₁, return
 2. F₁, ψ₂, return              0-10 meters    ⎫
                                 0-100 feet    ⎬  φ*₁
 3. F₁, ψ₁, calibrate                          ⎭
 4. F₁, ψ₂, calibrate
 5. F₂, ψ₁, calibrate  ⎫
 6. F₂, ψ₂, calibrate  ⎬       10-1000 meters  ⎫
                                              ⎬  φ*₂
 7. F₂, ψ₁, return    ⎫        100-10⁴ feet   ⎭
 8. F₂, ψ₂, return    ⎬
 9. F₃, ψ₁, return    ⎬
10. F₃, ψ₂, return    ⎭       1000-10⁴ meters ⎫
                                              ⎬  φ*₃
11. F₃, ψ₁, calibrate          10⁴-10⁵ feet   ⎭
12. F₃, ψ₂, calibrate
```

\* $\phi_1$, $\phi_2$, $\phi_3$ are summations of $\psi_1$, $\psi_2$, acquired in return and calibrate positions on respective frequencies.

The American system instrument reading will require three calculations and is composed as follows:

$$\frac{|X|XX|X.XX|}{|\ \ \ |\ \ \ |\ \ \ |} \text{ feet}$$
$$R_{3A}\ R_{2A}\ R_{1A}$$

where,
$R_{1A} \underset{R_1}{=} \phi_1/100$
$R_{2A} \underset{R_2}{=} [(\phi_1 - \phi_2) - (\text{units digit}, R_{1A})]$
$R_{3A} = [(\phi_1 - \phi_3) - (\text{tens digit}, R_{2A})]$
then
$\text{Range}_A = 1,000 R_{3A} + 10 R_{2A} + R_{1A}$ feet
1. Rounded off to nearest tens of feet.
2. Rounded off to nearest thousands of feet.

The metric system instrument reading requires three calculations and is composed as follows:

$$\frac{|X|XX|X.XXX|}{|\ \ \ |\ \ \ |\ \ \ |} \text{ meters}$$
$$R_{3M}\ R_{2M}\ R_{1M}$$

where,
$R_{1M} \underset{R_3}{=} \phi_1/1,000$
$R_{2M} \underset{R_4}{=} [(\phi_1 - \phi_2) - (\text{units digit}, R_{1M})]$
$R_{3M} = [(\phi_1 - \phi_3) - (\text{tens digit}, R_{2M})]$
then $\text{Range}_M = 1,000 R_{3M} + 10 R_{2M} + R_{1M}$ meters
3. Rounded off to nearest tens of meters
4. Rounded off to nearest thousands of meters.

For example, if $\phi_1$ was measured at 1,348.642; $\phi_2$ at 1,335.156; and $\phi_3$ as 1347.293 and $R_{1A}$ equals to 8.642; $R_{2A}$ equals 1,348.642 − 1,335.156 − 0.086 or 0340.000; and $R_{3A}$ equals 1348642 − 1347.293−0.349 or 1,000.00. Thus the distance measured would be 1,348.642 meters.

In FIG. 2 there is shown the optical system for the distance measuring device of the present invention. That is, as was previously discussed, the laser 12 transmits a beam through a converging lense 151 with a focal point at the focusing lense t6 of the collimator t8. The beam from the laser 12 passes through the converging lense 151 to the reflected mirrors 150 and 152 and thence to the electrooptical light modulator 14. As has been discussed previously, the light modulator 14, includes a birefringent crystal which causes four diverging beams to be produced about the central polarized beam. These are best shown in FIG. 3, which is the pattern of the light emenating from the electro-optical modulator 14 on the shield 165. Thus, as shown in FIG. 3, there is a central beam 153 and four diverging beams 155, 157, 159 and 161 surrounding the central beam 153 and at an acute angle to the central beam 153. The planes of these diverging beams 155, 157, 159 and 161 are orthogonal to one another and, it can be seen, that it will be possible to screen out the diverging beams 155, 157, 159 and 161 with a suitable shield 165 having an aperture 163, 165.

The light modulator 14 transmits the signal including the central beam 153 and the divergent beams 155, 157, 159 and 161 through analyzer 154 to a beam splitter 156. The beam splitter 156 sends the output of the modulator 14 directly through the focusing lense t6 of the collimator into a 45° mirror 158. The distance bewteen the center of the beam splitter 156 and the mirror 158 is $a_2$. The distance between the output of the electro-optical light modulator 14 and the beam splitter 156 is $a_1$. Light transmitted through the beam splitter 156 to mirror 158 is then reflected through aperture 163 in screen 165 to a second mirror 160 which directs it toward the target which is in the form of a retroreflector 162. Aperture 163 insures that only the central beam 153 passes to the mirror 16 and thence toward the retroreflector 162. The mirror 160 passes the light through the collimator t8. The distance between the mirror 158 and mirror $a_3$. The distance between the outer surface of collimator lense t8 and retroreflector 162 is L. The distance between mirror 160 and the back surface of lens t8 is $a_4$. The return light of the retroreflector 162 passes back through the lens and is focused on the receiving diode 24.

The beam splitter 156 further transmits the output of electro-optical light modulator 14 toward another mirror 164. Internal solenoid 20 is operative to cut off light returning from retroreflector 162 and prevent a beam from returning to the receiving diode 24 while opening the path between beam splitter 156 and mirror 164. Alternatively, the internal solenoids cut off the internal light path between beam splitter 156 and mirror 164 and opens the path from the retroreflector 162 to the diode.

The internal path continues from the mirror 164 back to the receiving diode 24. The mirror 164 is positioned so that the distance between beam splitter 156 and mirror 164 is exactly equal to the distance between the mirror 158 and mirror 160 or $a_3$. Further, the distance between the beam splitter 156 and mirror 158 is exactly equal to the distance between mirrors 164 and 160 or $a_2$. The plumb axis of the instrument is designated as 166. This axis can be preset when manufacturing the instrument. The distance between the plumb axis 166 and the mirror 164 as designated $a_5$, whereas the distance from plumb axis 166 to receiving diode 24 is designated as $a_6$.

It can be seen that in certain instruments, the geometry of the system may be such that, with proper design, the optical lens system will automatically act as an aperture to eliminate the divergent beam surrounding the central beam from the electro-optical modulator. Further, electro-optical modulators may be developed wherein the divergent beams have an angle of diversion so great as to avoid any interference, especially at short distances, with the central beam.

It should also further be noted that although, theoretically, it would be best to place the aperture 163 in the shield 165 at the focal point of the converging lense 151, thus, in front of focusing lens t6, this is not a practical result. That is, since at the focal point of lens 151 the central beam is a very small point, it would be extremely difficult to accurately position the shield 165 so that proper elimination of the divergent beams 155, 157, 159 and 161 is achieved. Additionally, if by reason of mechanical movement, temperature changes, etc., there is any movement of the shield 165, it may well occur that the central beam is itself shielded by the shield 165 so that no measurement can be taken. This would be extremely unfortunate and, of course, not desirable. The focusing lens t6 of the collimator in fact magnifies the beam before it passes into the main collimator lens t8. Thus, the central beam is of expanded size when it passes through the aperture 163 and the aperture 163 is sufficiently large so that any small movement of the shield 165 will not substantially cut off the central beam. Additionally, there is still sufficient spacing between the central beam and the divergent beams so that little if any of the signal from the divergent beams passes out of the instrument. Although physical compensation external to the modulator has been achieved to eliminate the divergent beams which are produced in the electro-optical light modulator 14, now understanding the problem, it may be possible to develop a birefrigent crystal which eliminates this problem at its source.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

What is claimed is:

1. A compensation device for a polarized light electro-optical modulator comprising:
   A. a polarized light source,
   B. a birefrigent crystal electro-optical modulator positioned along the optical axis of the polarized light from said polarized light source,
   C. said birefrigent electro-optical light modulator producing a central polarized output beam and observable divergent light beams at acute angles to the axis of said central beam, and
   D. shield means positioned along the optical axis of said central beam, said shield means having an aperture of a size sufficient to allow passage of said central beam, but small enough to obstruct passage of said divergent beams.

2. The compensation device of claim 1 wherein said polarized light source is a laser.

3. The compensation device of claim 1 including converging lens means positioned between said polarized light source and said electro-optical modulator, said converging lense means having a focal point beyond the output of said electro-optical modulator, and said shield being positioned to receive the focused central beam through said aperture.

4. The compensation device of claim 3 including a collimating lens, said collimating lens magnifying the central beam after passage through said aperture.

5. An electro-optical surveying instrument comprising:
   a. a source of radiation,
   b. radiation modulating means for modulating said source of radiation at one or more frequencies,
   c. reference frequency means for supplying a reference frequency signal so said modulating means, to cause said source of radiation to be modulated at said reference frequency,
   d. radiation sensitive detection means for receiving return radiation signals,
   e. phase comparison means for comparing said reference frequency signal with the return signal to obtain a measurement of the distance of said radiation travel, said radiation modulating means including a birefrignet crystal which creates observable divergent beams around a central beam, and means for eliminating said divergent beams and allowing only said central beam to be transmitted, said means for eliminating said divergent beams including a shield having an aperture positioned at a point spaced from said radiation modulating means, said aperture having an area equal to the size of the central beam, but being sufficiently small so as to prevent passage through the shield of said divergent means.

6. The electro-optical surveying instrument of claim 5 including coverging lens means positioned between said source of radiation and said radiation modulating means to concentrate said central beam and separates the central beam from said divergent beams.

7. The electro-optical surveying instrument of claim 6 wherein said source of radiation is a laser.

* * * * *